(12) United States Patent
Biggel et al.

(10) Patent No.: US 8,813,638 B2
(45) Date of Patent: Aug. 26, 2014

(54) SHAPING AND COOLING DEVICE

(71) Applicant: Hochland Natec GmbH, Heimenkirch (DE)

(72) Inventors: Andreas Biggel, Hergatz (DE); Roland Zeuschner, Argenbuehl (DE); Josef Burger, Leutkirch-Reichenhofen (DE); Wolfgang Huber, Blaichach (DE); Wilhelm Baur, Gestratz (DE)

(73) Assignee: Hochland Natec GmbH, Heimkirch (DE)

( * ) Notice: Subject to any disclaimer, the term of this patent is extended or adjusted under 35 U.S.C. 154(b) by 0 days.

(21) Appl. No.: 13/739,084

(22) Filed: Jan. 11, 2013

(65) Prior Publication Data

US 2013/0122169 A1 May 16, 2013

Related U.S. Application Data

(62) Division of application No. 10/561,881, filed as application No. PCT/EP2004/004138 on Jan. 19, 2004, now abandoned.

(30) Foreign Application Priority Data

Jun. 26, 2003 (DE) .................................. 103 28 905

(51) Int. Cl.
*A23C 19/00* (2006.01)
(52) U.S. Cl.
USPC .............................. 99/517; 426/512; 426/516
(58) Field of Classification Search
CPC .................................. A23B 4/08; A23C 19/09
USPC ............ 99/326–346, 457–459, 517; 426/502, 426/515, 517, 519, 524, 582
See application file for complete search history.

(56) References Cited

U.S. PATENT DOCUMENTS

2002/0027309 A1* 3/2002 Fujii et al. .................. 264/210.2

* cited by examiner

*Primary Examiner* — Brian Jennison
(74) *Attorney, Agent, or Firm* — Stolmar & Partner; Robert Lelkes

(57) ABSTRACT

The invention relates to a method for cooling a flowable melted food material including:
(a) providing a device comprising a first cooling belt and a second cooling belt parallel to the first cooling belt, wherein each cooling belt is continuous and has an outer surface and an inner surface, the first and second cooling belts are aligned at an angle between 45° and 90° relative to horizontal, and the outer surface of the first cooling belt and the outer surface of the second cooling belt are spaced apart to form a gap having a top end and a bottom end;
(b) introducing a free-flowing molten food product capable of forming a food product having a pasty consistency is cooling at the top end of the gap;
(c) counter-rotating the first and second cooling belts toward each other at the top end of the gap to draw the molten food product between the downward moving outer surfaces of the first and second cooling belts to form a strip of molten food product between the downward-moving outer surfaces of the first and second cooling belts: and
(d) applying a cooling liquid to the inner surfaces of the first and second cooling belts to cool the free-flowing molten food product to form a strip of food product having a pasty consistency, whereby the strip of food is cooled simultaneously on both sides.

20 Claims, 2 Drawing Sheets

Figure 1:
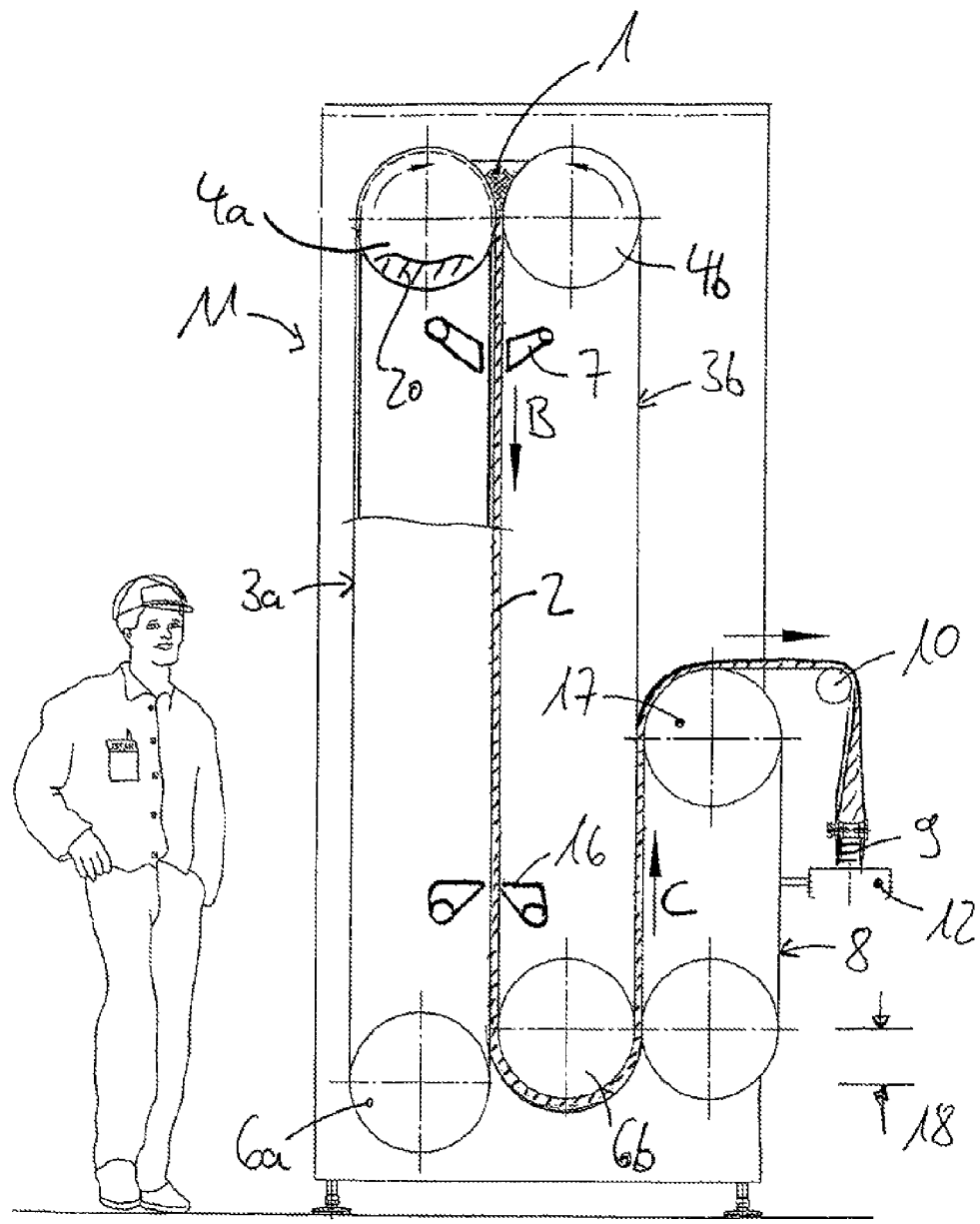

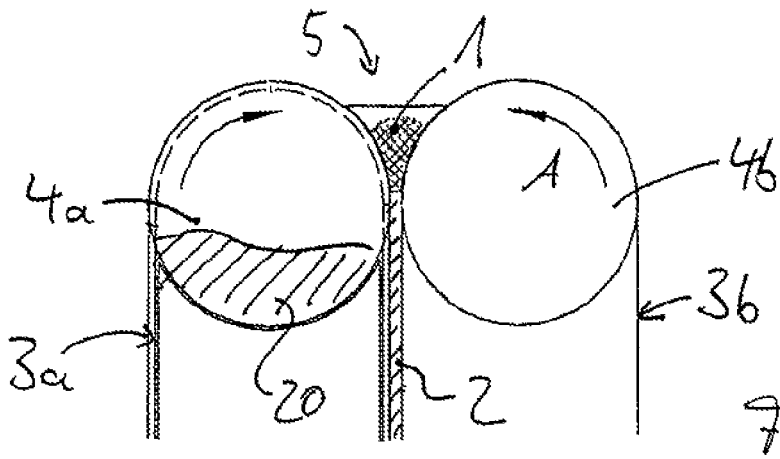
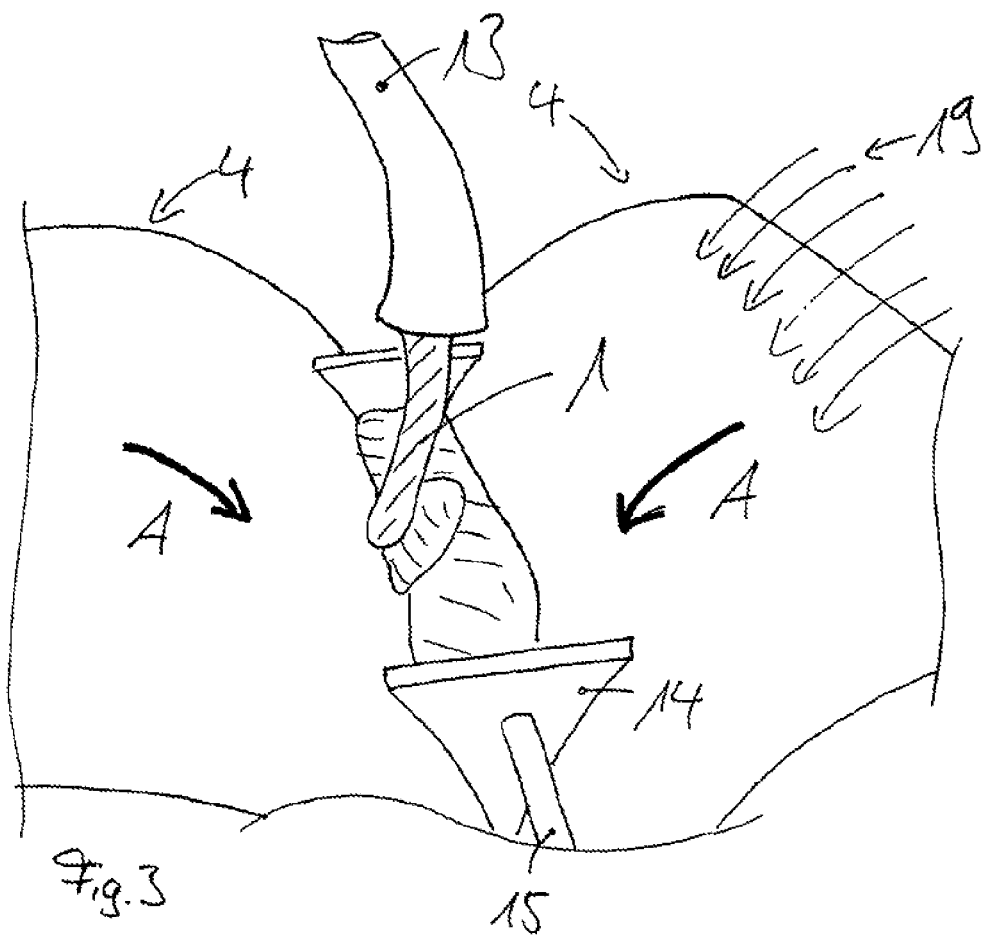

SHAPING AND COOLING DEVICE

The specification, claims and abstract of prior U.S. patent application Ser. No. 10/561,881 and the corresponding parts of international patent application number PCT/EP/04/04138 filed on Apr. 19, 2004 are each incorporated by reference their entirety as if fully reproduced herein.

The present invention relates to a device for cooling a product, namely a free-flowing melted food product, in particular a cheese melt, which is shaped into a continuous strip of food, said device having two cooling belts running continuously and in parallel with one another, guiding the flat strip of food product in contact on both sides of the strip, thereby cooling it. The present invention also relates to a method for shaping and cooling the food product.

It is known in general from processing a cheese melt into individual slices that the hot melt can be rolled out to form a wide continuous strip, which is then cooled to the temperature required for further processing. A known type of cooling device uses a cooling roller around which the belt is wrapped and entrained over the greatest possible angular range before being separated from the roller. Cooling is accomplished by means of a cooling medium introduced into the roller, e.g., cold glycol. Cooling by conveyance of the strip on a cooling belt is also known, in which case the cheese is acted upon by a stream of cooling air and the belt itself can be cooled with glycol or a stream of air.

One disadvantage of the known types of cooling is that the rate of further processing is greatly limited by the slow cooling process. This disadvantage cannot be compensated by a further reduction in temperature because a cheese melt product that is cooled too much and too rapidly at the surface may suffer an extreme loss of quality. With the known one-sided cooling, it is difficult to achieve the desired homogeneity of the end product, so there are fluctuations in weight in the meantime.

It is also known of other systems that the melt may be cooled between two cooling belts. Although an increased cooling output is achieved with these systems, an exact homogeneity of the product properties cannot be ensured because of the gravitational force acting on the strip of cheese to be cooled. Such a system should also be operated only in conjunction with separate means for shaping ("calibration") of the food strip situated upstream from the cooling zone in the direction of processing. Such means are complex and expensive to operate and frequently result in downtime of the entire system because of clogged inlet nozzles. Furthermore, cooling of belts that run horizontally poses problems in maintaining the required level of hygiene because the product easily comes in contact with dripping cooling medium.

The object of the present invention is now to create a device for cooling a free-flowing molten food product, in particular a cheese melt product which can be implemented with simple means and permits an increase in processing speed with a simultaneous improvement in the quality of the end product with regard to homogeneity and hygiene. Furthermore, it is the object of the present invention to create a method that is easy to implement for shaping and cooling the food product.

These objects are achieved through a device having the characterizing features of claim 1 and a method according to claim 16.

The core idea of the present invention is not to arrange the cooling belts horizontally, as has been known in the past, but instead to align them with a considerable angle of slope to the horizontal. The angle of slope to the horizontal here is at least 45°, and in a case that is particularly advantageous and easy to implement, it is exactly 90°, so that the cooling belts are arranged vertically accordingly. This vertical arrangement of the cooling belts is especially space-saving and permits cooling of the food strip on both sides with a high efficiency accordingly. While the product is still in a free-flowing state, it is guided by the two cooling belts that are in contact with it on both sides and therefore it cannot run off or undergo a change in shape, so this makes it simple and convenient even to process products that are difficult to handle because of their viscosity.

In relation to the known cooling rollers, this yields a cost advantage due to the elimination of the complex and cost-intensive Teflon-coated rollers; with known equipment, such a roller is arranged in the intake area for the purpose of calibration of the strip. Additional cost advantages are achieved due to a simpler design, a greater reliability and a longer lifetime of the device. On the whole, the inventive device leads to an increase in processing speed with an improvement in the quality of the end product with regard to its homogeneity and external appearance at the same time. Since the problem of interfering deposits of the product remaining on belts running vertically occurs to a far lesser extent than with the known systems, longer production cycles and operating times are possible with the device according to this invention without troublesome maintenance or cleaning work. Nevertheless a maximum level of hygiene can be ensured through the present invention, which is attributable in particular to the fact that the product and cooling medium can be separated cleanly.

Other essential advantages of the inventive device also result from the fact that with the vertical alignment, the influence of gravity, which has been a negative influence in the past, can be minimized; with the known equipment, this has resulted in inhomogeneities within the finished product because of the load on one side. This advantage is obtained in particular for an advantageous embodiment in which the direction of movement of the cooling belts is vertically on the one hand and on the other hand is from top to bottom so that the influence of gravity can be utilized in the production of the strip. In the case of the cheese melt, the temperature of the product supplied to the device is approximately 80° C. to 90° C., so it is converted directly to its final shape and properties with respect to the surface, the dimensions of the strip and the consistency suitable for further processing under the influence of the forces acting symmetrically. In the case of cheese melt, the suitable consistency is reached when the strip has been cooled to a temperature of approximately 5° C. to 15° C. One advantage of cooling on both sides during vertical movement is also to be found in the fact that a homogeneous and especially smooth surface of the cheese melt is obtained due to the direct and long-lasting contact of the cooling belts with the food product.

In the inventive cooling process, there is permanent processing of the food strip that can be controlled without interruption since parameters such as the contact pressure, the strip width and temperature can be adjusted at any time. The device can thus be optimally adjusted to the particular product. In particular the speed of the cooling belts can be adjusted so that the food product, in particular the cheese melt, has reached a pasty state with a stable shape on its discharge from the cooling equipment, and in this state its individual layers are laminable although the individual layers do not adhere to one another.

An important advantage of the present invention also includes the fact that due to the vertical arrangement with the parallel guide rolls arranged at the top, it is easy to create a calibration device to which the product can be supplied by simply filling the filling gap; this filling gap is formed by the space enclosed by the guide rolls and impart the correct shape to the product. The filling of the device is thus performed via the calibration device, where the contra-rotating guide rollers carrying the cooling belts shape the material fed into the filling gap for the purpose of calibration to form the strip. Two lateral borders are advantageously provided to define the width of the food strip, with the distance between the borders and the distance from the rollers carrying the cooling belts being adjustable. The device thus serves simultaneously as a shaping device and as a cooling device. The thickness and width of the strip to be cooled are thus adjustable via the width and thickness of the filling gap by means of these inventive devices for calibration, and additional means may be omitted.

In addition, it is advantageous if the calibration device has multiple means with which the width of the food product strip is also defined between the cooling belts. These means are advantageously formed by tubes which are made of Teflon in particular and are suspended from the bordering means. They then hang down into the gap between the parallel cooling belts accordingly. The tubes are advantageously connected to an air pump with which they can be inflated. In the inflated state, the tubes are in contact with the cooling belts and thus define the width and height of the channel between the cooling belts. Through these means it is possible to prevent the width of the food product strip from changing during cooling, resulting in a non-uniform width. A particular advantage of the bordering means and the supplementary means extending into the gap is that the width of the food strip is accurately adjustable and there is no reworking of the edges, and in particular no edge strip needs to be cut off. This makes it possible to eliminate one step in the operation. Furthermore, there is no unnecessary waste, which thus reduces product loss.

In another preferred embodiment, the cooling belts are sprayed with a cooling fluid on the surface facing away from the food product strip for the purpose of cooling the latter. Since the cooling belts produce a particularly effective and homogeneous cooling, it is possible to use simple ice water at a temperature of a few ° C. It is also possible to eliminate the use of a cooling medium such as glycol, which is problematical because of the hygiene standard that must be maintained. This yields the advantage of lower cost on the one hand while on the other hand also minimizing disposal costs. For cooling to temperatures of 0° C. or less than 0° C., the water may be mixed with salt, in which case the cooling belts are then sprayed with this saline solution accordingly. Another advantage of the vertical cooling belts is that the cooling medium used can be removed in a controlled manner from the reverse side of the belts without dripping onto the product. Accordingly, a device for applying and removing the cooling liquid is to be provided, whereby the cooling liquid can be carried in circulation.

As already explained, there is an important advantage in the hygiene that can be achieved with the present invention. This is also due to the fact that the cooling belts induce adequate cooling because of their great efficacy even when they are cooled with simple ice water to temperatures of no less than 2-3° C. If the outside air temperature is adjusted accordingly, formation of water of condensation can thus be prevented, which is especially important for bacteriological reasons in producing cheese melt. To be able to guarantee an outside air temperature of 6-8° C., the entire system may be shielded in a simple manner and supplied with sterile and cooled air.

Means are to be provided with the inventive device for releasing the strip from the cooling belt at the end of the cooling zone and deflecting it in a direction so that it can be sent for further processing. To this end, two methods have been proposed, which may be employed jointly or alternatively:

It has been found that the release of the cheese melt from one of the two cooling belts is determined by the difference in temperature between the cooling belts at the site of application, i.e., at the filling gap. To facilitate the separation from a certain cooling belt, its temperature in the filling gap is set approximately 2° C. to 5° C. lower than the temperature of the other cooling belt. This lower temperature is also reached by tempering, in particular by filling the upper drive roller with cooling liquid that has been cooled accordingly. The initial temperature difference acts from the application level to the first cooling water application site downstream from calibration of the cheese strip. The product remains adhering at the belt outlet to the belt having the higher application temperature. It is thus possible to make statements regarding the course of the food strip at the outlet via the temperature setting at the point of application.

As an alternative or supplementary method, it is proposed that the two cooling belts should have different lengths at the end of the cooling zone. It has been found that the cheese strip is lifted away from the other cooling belt traveling straight ahead, preferably together with the one cooling belt which bends away from the other cooling belt traveling straight ahead. It is thus possible to achieve a defined deflection of the cheese strip through an offset. In the case of a vertical arrangement, this effect may be achieved by the fact that the axis of one of the two lower guide rollers is arranged below the axis of the other lower guide roller by an offset distance in the vertical direction, so that the cooling belt that is guided by this roller is separated from the other cooling belt, which is still running vertically at this location.

Another advantage of this invention is that the cooling belts can be covered with added ingredients, in particular herbs or spices, above the filling gap, and these added ingredients can then be incorporated into the surfaces of the strip of cheese melt in a shaping operation. In contrast with the known products in which the added ingredients are distributed throughout the entire product and thus are largely invisible, with this type of production the added ingredients remain on the surface and are thus visible for the customer. Therefore, the attractiveness of the product in the eyes of the consumer can be increased.

It is also advantageous that cheese melt can be processed with a smaller amount of dry solids in relation to known manufacturing processes without resulting in sticking to the cooling equipment. In comparison with the cooling roller made of Teflon used in the past, this easily permits a reduction in dry solids by approximately 1%.

A special embodiment of the present invention is illustrated in FIGS. 1 through 3 and described in greater detail below. They show:

FIG. 1 the device for shaping and cooling,
FIG. 2 the filling gap of the device and
FIG. 3 a perspective view of the filling gap.

FIG. 1 shows schematically a device approximately 3 meters high for cooling a cheese melt 1 (see also FIG. 2), which is rolled to form a continuous strip 2 of food product on entrance into the cooling zone of the device.

The device has two continuous contra-rotating (arrows A) cooling belts 3a and 3b, which guide the cheese strip 2 that is running downward by coming in contact with it on both sides and thereby cooling it. The two cooling belts 3a and 3b run in parallel, with the distance between them defining the thickness of the cheese strip 2. The direction of movement is from top to bottom (arrow B).

The free-flowing cheese product 1 is introduced into a filling gap 5 via a filling device 13 (FIG. 3), said filling gap being formed by two upper guide rollers 4, which are arranged in parallel and guide the cooling belts 3. The guide rollers 4 are driven. The filling gap 5 forms an ideal product storage with a buffering function by which the product 1 is provided for calibration, in particular for adjusting the width and thickness of the strip. The cooling belts 3 are each guided by two lower guide rollers 6 which are not driven. Herbs and/or spices may be applied to the guide rollers 4 about which the cooling belt 3 is wrapped (arrow 19) and they remain on the surface of the cheese strip 2.

Two bordering means 14 in the form of triangles made of plastic are provided for adjusting the width of the strip; the sides of these triangles are adapted to the curvature of the belts and extend at one tip into the filling gap 5. The bordering means 14 are displaceable on rod-shaped holders 15. These means, which are suitable for calibration, are arranged symmetrically, which has a positive effect on the weight of the product. The product is thus influenced uniformly from both sides and no separate calibration device situated upstream from the cooling belts 3 in the direction of movement is necessary for adjusting the thickness of the belt 2. The width of the filling gap and thus the thickness of the cheese strip 2 are adjustable via the distance of the guide rollers 4 and 6, whereby the strip is horizontally displaceable with the rollers 4b and 6b.

According to this invention, the cooling belts 3 are aligned vertically and guide the cheese strip 2 at a corresponding angle. They are made of steel strip, where the steel strip typically has a thickness of approximately 0.2 millimeter to 1 millimeter and a width of approximately 1.5 meter. To guide a cooling belt 3 on the rollers 4 and 6, it may be provided with rubber profiles on the inside running parallel to the direction of movement. For example, profiles having a trapezoidal cross section in particular may be glued to the edges of a cooling belt 3, extending beyond the corresponding edges of the rollers. This ensures guidance of the cooling belts 3 in the direction perpendicular to the direction of movement.

The thickness of a cooling belt 3 is indicated by the interrupted line in the case of the guide roller 4a. The cooling belts 3 run over the lower guide rollers 6 at the bottom. The cooling belts 3 move almost freely between the pairs of guide rolls 4 and 6, where a pressing device (not shown) is provided, acting on one of the cooling belts 3; the distance between the cooling belts 3 and/or the contact pressure on the belt 1 is adjustable by means of this device. The cooling belts 3 are sprayed with cooling ice water on the surface facing away from the belt 1 by means of guide channels 7, so that the ice water is entrained downward and is ultimately removed via the stripper 16.

The cheese strip 2 is guided around the lower guide roller 6b and runs upward again (arrow C) in a manner such that it is secured between the cooling belt 3b and a transfer belt 8. At the point of transfer to water processing, the wide cheese strip 2 is cut into multiple narrow strips by a cutting roller 10, the strips are then rotated 90° individually and laid one above the other on a stack 9. The stack 9 of successive strips is removed from the device by a discharge belt 12, and then stacks of individual slices are cut off from the stacked strips. It can be seen clearly that the axis of the roller 6b is arranged above that of the roller 6 with an axial offset 18 to ensure that the cheese strip 2 will remain on the belts 3b. The roller 17 guiding the transfer belts 8 separates the cheese strip 2 from the belts 3b with no problem due to the abovementioned separation effect. Furthermore, the guide roller 4a is cooled by approximately 5° C. by introducing cooling liquid 20 in relation to the guide roller 4b, so that separation of the cheese strip 2 from the cooling belt 3a is ensured.

To be able to ensure a controllable climate, the cooling equipment must be surrounded by a relatively tightly sealed housing 11.

What is claimed is:

1. A method for shaping and cooling a free-flowing molten food product comprising:
   (a) providing a device comprising a first cooling belt and a second cooling belt parallel to the first cooling belt wherein each cooling belt is continuous and has an outer surface and an inner surface, the first and second cooling belts are aligned at an angle between 45° and 90° relative to horizontal, and the outer surface of the first cooling belt and the outer surface of the second cooling belt are spaced apart to form a gap having a top end and a bottom end;
   (b) introducing a free-flowing molten food product capable of forming a food product having a pasty consistency upon cooling at the top end of the gap;
   (c) counter-rotating the first and second cooling belts toward each other at the top end of the gap to draw the molten food product between the downward moving outer surfaces of the first and second cooling belts to form a strip of molten food product between the downward-moving outer surfaces of the first and second cooling belts; and
   (d) applying a cooling liquid to the inner surfaces of the first and second cooling belts to cool the free-flowing molten food product to form a strip of food product having a pasty consistency, whereby the strip of food is cooled simultaneously on both sides.

2. The method of claim 1, wherein the food product is cheese.

3. The method of claim 2, wherein the temperature of the strip of cheese exiting the device is approximately 5° C. to approximately 15° C.

4. The method of claim 1, wherein each cooling belt is a metal strip.

5. The method of claim 1, wherein the cooling liquid comprises water.

6. The method of claim 4, wherein the cooling liquid comprises water.

7. The method of claim 1, wherein the cooling liquid is applied to at least one inner surface at a temperature in the range from less than 0° C. to 3° C.

8. The method of claim 7, wherein the first cooling belt at the upper end of the gap has a temperature approximately 2° C. to 5° C. lower than the temperature of the second cooling belt at the upper end of the gap.

9. The method of claim 2, wherein the cooling liquid is applied to at least one inner surface at a temperature in the range from less than 0° C. to 3° C.

10. The method of claim 9, wherein the first cooling belt has a temperature approximately 2° C. to 5° C. lower than the temperature of the second cooling belt at the upper end of the gap.

11. The method of claim 1, wherein the cooling liquid is applied to the inner surface of each cooling belt at a temperature in the range from less than 0° C. to 3° C.

12. The method of claim 2, wherein the cooling liquid is applied to the inner surface of each cooling belt at a temperature in the range from less than 0° C. to 3° C.

13. The method of claim 11, wherein the first cooling belt at the upper end of the gap has a temperature approximately 2° C. to 5° C. lower than the temperature of the second cooling belt at the upper end of the gap.

14. The method of claim 7, wherein each cooling belt is a metal strip.

15. The method of claim 8, wherein each cooling belt is a metal strip.

16. The method of claim 9, wherein each cooling belt is a metal strip.

17. The method of claim 7, wherein the cooling liquid comprises water.

18. The method of claim 8, wherein the cooling liquid comprises water.

19. The method of claim 9, wherein the cooling liquid comprises water.

20. The method of claim 14, wherein the cooling liquid comprises water.

\* \* \* \* \*